Oct. 3, 1961 K. F. JAHN 3,002,782
UNITARY FRAME AND BODY FOR A WHEELED VEHICLE
Filed April 22, 1960 2 Sheets-Sheet 1
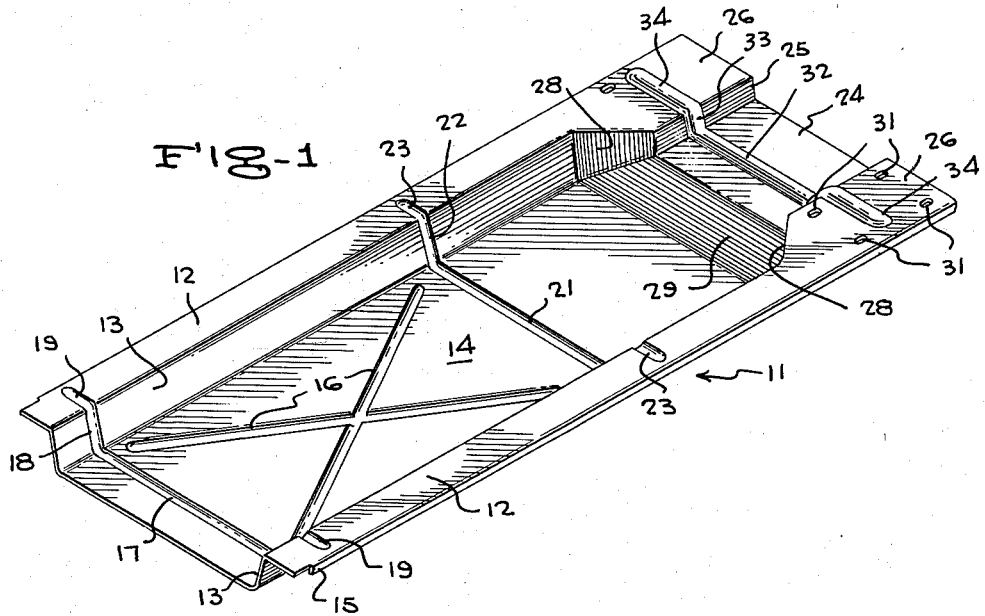
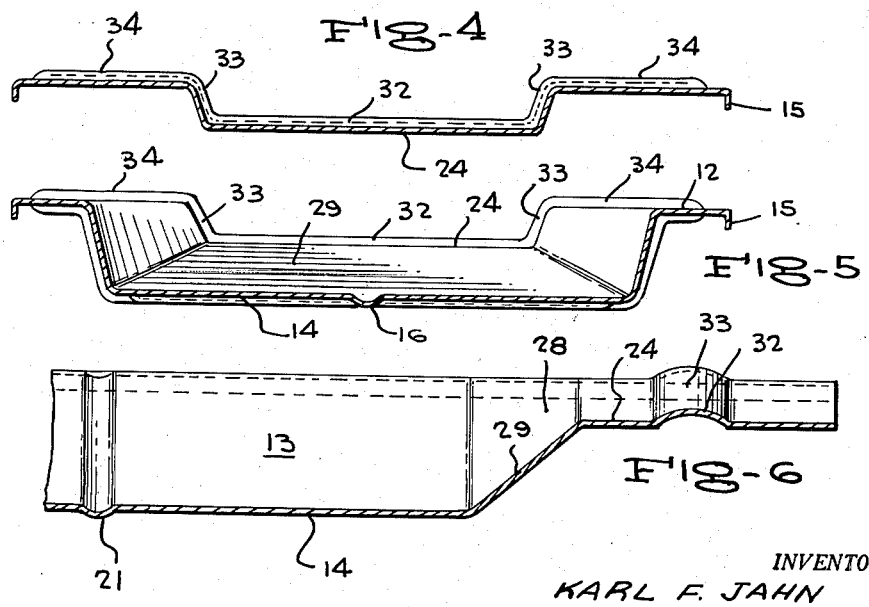
INVENTOR.
KARL F. JAHN
BY
McMorrow, Berman & Davidson
ATTORNEYS

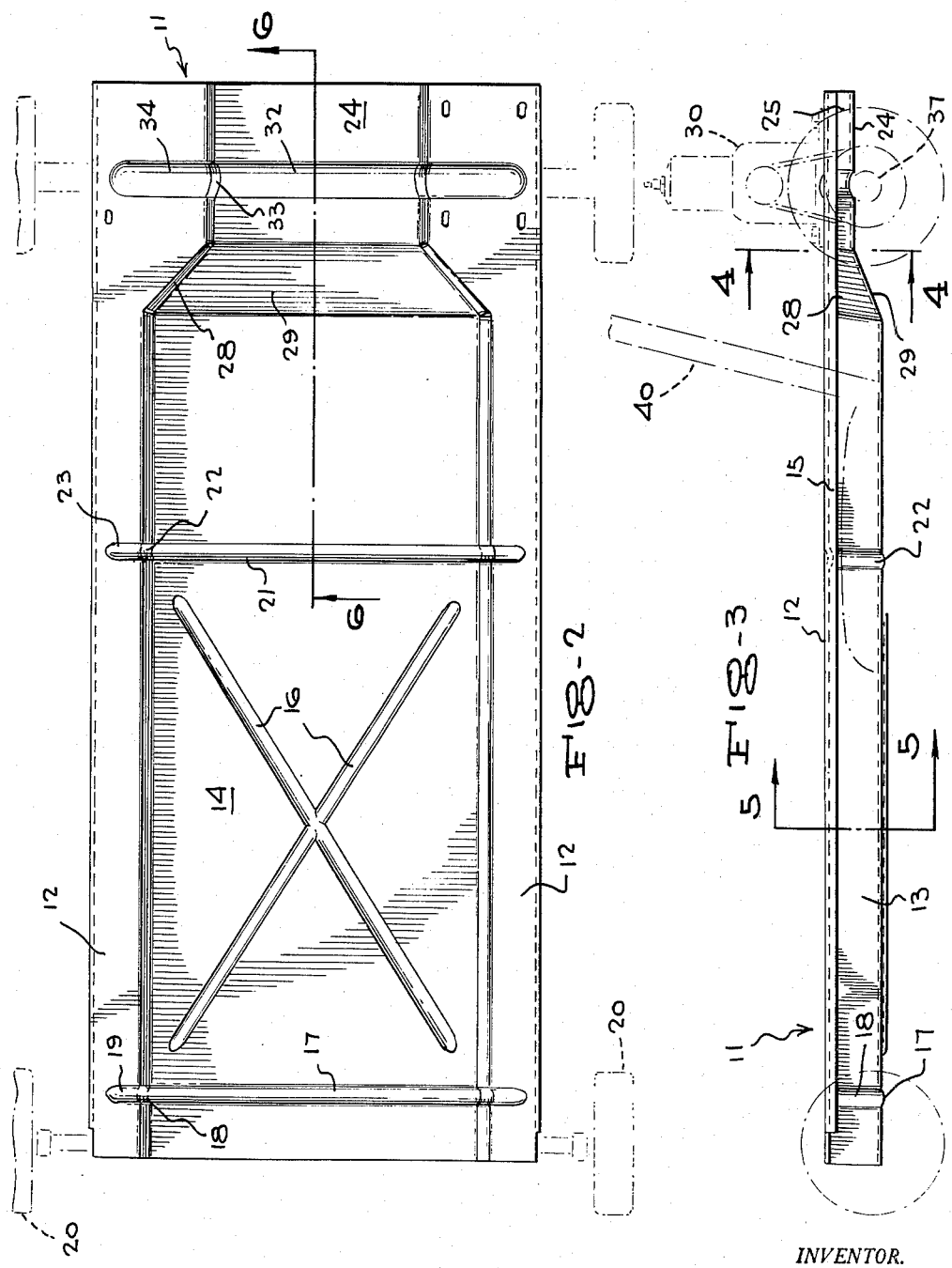

United States Patent Office 3,002,782
Patented Oct. 3, 1961

3,002,782
UNITARY FRAME AND BODY FOR A WHEELED VEHICLE
Karl F. Jahn, 2710 Everts, Windsor, Ontario, Canada
Filed Apr. 22, 1960, Ser. No. 24,073
3 Claims. (Cl. 296—28)

This invention relates to vehicle frames, and more particularly to a unitary frame and body construction for a motor-driven wheeled vehicle commonly known as a "Go-Kart."

A main object of the invention is to provide a novel and improved unitary frame and body for a small motor-driven wheeled vehicle commonly known as a "Go-Kart," the combination frame and body being simple in construction, being inexpensive to manufacture, being relatively light in weight, and being attractive in appearance.

A further object of the invention is to provide an improved unitary frame and body for a motor-driven wheeled vehicle, the unitary frame and body being manufacturable from a single sheet of metal by a single simple stamping operation, providing a structure of substantial strength and safety, and making it relatively easy to assemble the remaining parts of the vehicle thereto.

Further objects and advantages of the invention will become apparent from the following description and claims, and from the accompanying drawings, wherein:

FIGURE 1 is a perspective view of an improved combined frame and body member for a motor-driven wheeled vehicle, constructed in accordance with the present invention.

FIGURE 2 is a top plan view of the combined frame and body member of FIGURE 1.

FIGURE 3 is a side elevational view of the combined frame and body member of FIGURES 1 and 2.

FIGURE 4 is a transverse vertical cross sectional view taken on the line 4—4 of FIGURE 3.

FIGURE 5 is a transverse vertical cross sectional view taken on the line 5—5 of FIGURE 3.

FIGURE 6 is a fragmentary longitudinal vertical cross sectional view taken substantially on the line 6—6 of FIGURE 2.

Referring to the drawings, 11 generally designates a combined frame and body for a motor-driven wheeled vehicle, such as a "Go-Kart," constructed in accordance with the present invention. The member 11 comprises a single sheet of metal of suitable thickness which is formed into a generally channeled shape, for example, by a stamping operation, the member being integrally formed with the outwardly extending horizontal flanges 12, 12, the downwardly and inwardly inclined walls 13, 13, and the horizontal bottom panel 14. The outwardly extending top flanges 12, 12 are formed at their outer edges with depending vertical, relatively short flange elements 15, to rigidify the flanges 12 at their outer edges. The bottom panel 14 is formed at its forward portion with the downwardly depressed inclined intersecting strengthening channels 16, 16 to rigidify the forward portion of said bottom panel. At the forward end of the member 11, a transversely extending downwardly-depressed strengthening channel 17 is pressed into the body, said strengthening channel extending upwardly along the inclined side wall 13, as shown at 18, and also for a substantial distance on the horizontal flanges 12, as shown at 19. The merging, downwardly pressed channels 17, 18 and 19 substantially rigidify the front marginal portion of the member 11, and provide sufficient strength so that the load on the forward portion of the body is safely supported thereon and is transmitted thereby to the front wheels of the vehicle, shown in dotted view at 20, 20.

The intermediate portion of the member 11 is likewise formed with a transversely extending depressed strengthening channel 21, similar to the channel 17, and the side walls 13 likewise are formed with channels 22 merging with the main channel 21. Similarly, the top flanges 12 are formed with channels 23 merging with the channels 22 and extending outwardly for the major portion of the width of the horizontal flanges 12.

The bottom panel 14 is upwardly offset at its rear end, as shown at 24, defining a shallower channel than the major portion of the body 11. Thus, the relatively shallow channel at the rear end of the body includes the side wall elements 25, 25 and the widened horizontal top flanges 26, 26.

As shown in FIGURES 1 and 2, the side wall elements 25 of the shallower channel are connected to the side wall elements 13 of the member 11 by the rearwardly converging side wall elements 28, 28, and the upwardly offset rear horizontal bottom panel 24 is connected to the main bottom panel 14 of the member 11 by the upwardly and rearwardly inclined bottom panel 29.

Because of the rearward convergency of the wall elements 28, 28, the rear portions of the top flanges 26 are relatively wide, and one of said top flanges may be utilized as a supporting base for the internal combustion engine 30 employed to drive the vehicle. For this purpose, one of the horizontal top flange elements 26 is formed with the bolt holes 31 spaced to receive the fastening bolts for the internal combustion engine 30 intended to be employed on the vehicle.

The shallower panel of the member 11 is formed with an upwardly pressed stiffening channel, comprising the transversely extending main channel element 32, the inclined channel elements 33, 33 merging therewith and the outwardly extending terminal channel elements 34, 34 merging with the inclined channel elements 33, 33. The channel elements 34, 34 extend for the major portion of the width of the widened rear horizontal flange members 26, 26, as is clearly shown in FIGURES 1 and 2.

The intermediate upwardly pressed channel 32 formed in the upwardly offset bottom wall member 24 serves to receive the rear axle 37 of the vehicle, as shown in dotted view in FIGURE 3, and thus serves as a positioning means for said rear axle. The rear axle is clamped to the upwardly offset shallower panel of the body 11 by any suitable fastening means, but is positively located by being partially received in the upwardly pressed channel portion 32.

As shown in FIGURE 3, the body may support the driver's seat 40 in its intermediate portion, immediately over the portion of bottom wall member 14 located forwardly adjacent the upwardly and rearwardly inclined bottom wall element 29. The front wheels are fastened to the portion of body 11 located forwardly adjacent the strengthening channels 17, 18 and 19, and the rear wheels are journaled on the axle 37, said axle being partially received in the upwardly-pressed channel 32 provided in the upwardly offset horizontal bottom panel 24. The engine 30 may be fastened to one of the relatively wide horizontal flange members 26, as above described.

As will be readily apparent, the member 11 may be readily fabricated by a single relatively simple stamping operation. The body 11 provides all the necessary components ordinarily required in a wheeled vehicle of the "Go-Kart" type, except for the motor, the wheel and axle assemblies, and the relatively minor additional assemblies such as the clutch and brake structure. In contrast to the combined frame and body member 11, in the normal construction of a "Go-Kart," a frame must first be fabricated, usually of round or square tubing welded together, and after the frame has been completed, a floor panel, motor mounting plates, and various other attachments must be added.

In the device of the present invention, the body 11 integrally includes the floor panel, the motor supporting means, and the bracing means, and no welding or other fastenings are required to prepare the body for assembly with the remaining parts of the vehicle.

While a specific embodiment of an improved combined frame and body for a wheeled vehicle of the "Go-Kart" type has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A frame for a wheeled vehicle comprising a generally channel-shaped body of rigid sheet material integrally formed and including a pair of longitudinally-spaced downwardly and inwardly-inclined walls, a horizontal bottom panel between and integrally attached to the lower ends of said walls, and an outwardly-extending horizontal flange on the upper end of each of said walls, the portion of said bottom panel adjacent one end being upwardly offset to form a shallower channel than that of said body, said offset bottom panel portion being provided with a transversely-disposed upwardly-pressed channel extending from one side edge to the other side edge for embracingly receiving the rear axle of the vehicle.

2. A frame for a wheeled vehicle comprising a generally channed-shaped body of rigid sheet material integrally formed and including a pair of longitudinally-spaced downwardly and inwardly-inclined walls, a horizontal bottom panel between and integrally attached to the lower ends of said walls, and an outwardly-extending horizontal flange on the upper end of each of said walls, the portion of said panel adjacent one end being upwardly offset to form a shallower panel than that of said body, an upwardly-offset inclined bottom panel connecting said offset horizontal bottom panel portion to the remainder of said horizontal bottom panel, said offset bottom panel portion being provided with a transversely-disposed upwardly-pressed channel extending from one side edge to the other side edge for embracingly receiving the rear axle of the vehicle.

3. A frame for a wheeled vehicle comprising a generally channel-shaped body of rigid sheet metal integrally formed and including a pair of longitudinally-spaced downwardly and inwardly-inclined walls, a horizontal bottom panel between and integrally attached to the lower ends of said walls, and an outwardly-extending horizontal flange on the upper end of each of said walls, the portion of said panel adjacent one end being upwardly offset to form a shallower channel than that of said body, an upwardly-offset inclined bottom panel connecting said offset horizontal bottom panel portion to the remainder of said horizontal bottom panel, said offset bottom panel portion being provided with a transversely-disposed upwardly-pressed channel extending from one side edge to the other side edge for embracingly receiving the rear axle of the vehicle, at least one of said horizontal flanges being substantially enlarged in width adjacent said upwardly offset bottom panel portion to define a supporting base for an internal combustion engine.

References Cited in the file of this patent

UNITED STATES PATENTS

| | | |
|---|---|---|
| 1,483,650 | Corbin | Feb. 12, 1924 |
| 2,271,310 | Schafer | Jan. 27, 1942 |
| 2,637,592 | Karlby | May 5, 1953 |
| 2,733,096 | Waterhouse et al. | Jan. 31, 1956 |
| 2,883,232 | Olley et al. | Apr. 21, 1959 |

FOREIGN PATENTS

| | | |
|---|---|---|
| 191,748 | Austria | Sept. 10, 1957 |